US012799707B2

(12) United States Patent
Majewski et al.

(10) Patent No.: US 12,799,707 B2
(45) Date of Patent: Nov. 17, 2026

(54) LUBRICATION SYSTEM AND METHOD FOR KINEMATIC LINKAGE

(71) Applicant: Caterpillar Inc., Peoria, IL (US)

(72) Inventors: Ryan M. Majewski, Sycamore, IL (US); Brian C. Howson, Bolingbrook, IL (US); Shaun D. Currier, Naperville, IL (US); Lei Wang, Hoffman Estates, IL (US); Chase E. Smith, Morton, IL (US); Dragos Marinescu, Montgomery, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/823,209

(22) Filed: Sep. 3, 2024

(65) Prior Publication Data

US 2026/0062889 A1 Mar. 5, 2026

(51) Int. Cl.

| | |
|---|---|
| ***E02F 9/08*** | (2006.01) |
| ***E02F 3/34*** | (2006.01) |
| ***E02F 9/26*** | (2006.01) |
| ***F16N 29/02*** | (2006.01) |

(52) U.S. Cl.

CPC .............. *E02F 9/0858* (2013.01); *E02F 3/34* (2013.01); *E02F 9/26* (2013.01); *F16N 29/02* (2013.01); *E02F 9/0841* (2013.01)

(58) Field of Classification Search

None

See application file for complete search history.

(56) References Cited

U.S. PATENT DOCUMENTS

| | | | | |
|---|---|---|---|---|
| 5,482,138 | A | 1/1996 | Mori et al. | |
| 11,198,990 | B2 | 12/2021 | Kumar et al. | |
| 2007/0087211 | A1* | 4/2007 | Endres | C23C 28/046 427/299 |
| 2020/0018440 | A1 | 1/2020 | Shiratani et al. | |
| 2022/0341132 | A1* | 10/2022 | Carpenter | E02F 9/267 |
| 2023/0243466 | A1* | 8/2023 | Howson | E02F 3/3405 184/6.4 |

FOREIGN PATENT DOCUMENTS

| | | | |
|---|---|---|---|
| CN | 115983558 | A | 4/2023 |
| JP | 8-219378 | A | 8/1996 |
| JP | 2000-74292 | A | 3/2000 |
| JP | 2011-162944 | A | 8/2011 |

* cited by examiner

*Primary Examiner* — Lail A Kleinman

(57) ABSTRACT

A machine can include one or more kinematic linkages having pivot joints that are pivotally articulated by associated hydraulic cylinders. To determine the total joint forces applied to the pivot joints, pressure data is obtained from the hydraulic cylinders and converted to cylinder forces. The cylinder forces are analyzed to determine the total joint forces, and the total joint forces are used to calculate wear severity with respect to the pivot joints. The wear severity can be compared to a lubrication trigger value to determine whether to lubricate the pivot joints.

20 Claims, 5 Drawing Sheets

LUBRICATION SYSTEM AND METHOD FOR KINEMATIC LINKAGE

TECHNICAL FIELD

This patent disclosure relates generally to an industrial machine including a moveable kinematic linkage having one or more kinematic pivot joints and, more particularly, relates to a system and method of monitoring and lubricating the one or more kinematic pivot joints.

BACKGROUND

Industrial machines such as those used in construction, mining, agriculture, and similar fields may include a kinematic linkage configured to maneuver and engage a work tool to conduct various tasks or operations. An example of a kinematic linkage can be associated with a bucket loader in which a bucket is connected to the machine frame of a mobile machine through a pair of lift arms that can raise and lower the bucket with respect to the terrain surface. Another example of a kinematic linkage can be associated with an excavator in which an assembly of rigid links including boom, a dipper, and a bucket is connected and movable with respect to a swing platform rotating about the excavator undercarriage.

The kinematic linkage can be assembled from a plurality of rigid links connected together by kinematic joints that allow various degrees or ranges of motion such that the linkage can articulate and maneuver within a spatial envelop. Examples of kinematic joints include pivot joints, also referred to as pin joints or revolute joints, in which two rigid links are joined by a cylindrical pin that is inserted through a circular aperture defined by structural eyes formed on the two rigid links. The two rigid links can articulate with respect to each other by pivoting or rotating about the pin. A common example of a kinematic pivot joint may be a hinge. Other examples of kinematic pivot joints associated with a machine may be ball and socket joints. Moreover, machines that are more complex may be made of several kinematic linkages that include several kinematic joints to enable complex motions of the machine to perform the desired tasks.

Because the kinematic pivot joints include rigid links and other structural components moving with respect to each other while the kinematic linkage is subjected to or transferring significant loads, the pivot joints may require periodic lubrication to reduce friction and prevent wear or deterioration of the kinematic linkage. Typically, a lubricant such as grease or oil having a viscosity that enables relative motion between the rigid links is introduced to the pivot joint. By way of example, U.S. Pat. No. 5,482,138 describes an automatic greasing system that delivers grease at periodic intervals to pin-connected parts based on accumulated operating time. The present disclosure is directed to an improved system and method for monitoring and lubricating the pivot joints of a kinematic linkage.

SUMMARY

The disclosure describes, in one aspect, a mobile machine including an articulated machine frame with a forward frame end and a rearward frame end pivotally connected by a frame joint and a steering cylinder to pivot the forward frame end and the rearward frame end. The mobile machine also includes an implement linkage pivotally connected to the forward frame end at a lift joint and a lift cylinder connected between forward frame end and the implement linkage to pivot the implement linkage. A work tool is pivotally connected to the implement linkage at a tilt joint and can be pivoted by a tilt cylinder. To automatically lubricate the frame joint, lift joint, and/or tilt joint, the mobile machine includes an electronic controller that gathers pressure data associated with one or more of the steering cylinder, the lift cylinder, and the tilt cylinder. The electronic controller is programmed to convert the pressure data to a total joint force applied to one or more of the frame joint, the lift joint, and the tilt joint and compare the total joint force with a lubrication trigger value. If the total joint force exceeds the lubricant trigger value, the electronic controller lubricates the respective one of the lift joint, and the tilt joint.

In another aspect, there is disclosed a method for automatically lubricating a kinematic linkage associated with a machine. The method involves measuring pressure data associated with one or more hydraulic cylinders arranged to actuate the kinematic linkage and analyzing the pressure data to determine a total joint force applied to a pivot joint of the kinematic linkage. A wear severity is calculated for the pivot joint based on the total joint force and compared with a lubrication trigger value. If the wear severity exceeds the lubrication trigger value, the method results in lubricating the pivot joint.

In a further aspect, there is disclosed a mobile industrial machine including an articulated machine frame having a forward frame end and a rearward frame end pivotally connected at a frame joint. To pivotally steer the mobile industrial machine, a steering cylinder is connected between the forward frame end and the rearward frame end to pivot the articulated machine frame. The steering cylinder can receive hydraulic fluid from a steering control valve to control which direction pivot the articulated machine frame. An electronic controller is configured to obtain pressure data of the hydraulic fluid directed to the steering cylinder and convert the pressure data to a total joint force applied to the frame joint. The electronic controller is further configured to calculate a wear severity of the frame joint based on the total joint force, compare the wear severity with a lubrication trigger value of the frame joint, and lubricate the frame joint if the wear severity exceeds the lubrication trigger value.

DETAILED DESCRIPTION

Figure 2:
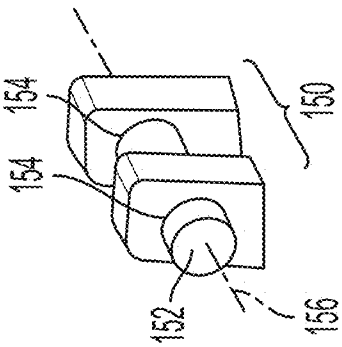
FIG. 2 is a detailed view of a kinematic pivot joint of the type included with the industrial machine enabling relative motion of kinematic linkages associated with the machine.

Now referring to the figures, wherein whenever possible like reference numbers refer to like elements, there is illustrated an example of a complex industrial machine in the form of a wheel loader 100 configured for lifting, hauling, and dumping materials such as soil, aggregate, rock, or the like. Wheel loaders 100 may be used in construction operations like earth moving, excavation, material handling and similar operations. While the present disclosure is described with respect to a wheel loader, the disclosure is applicable to any industrial machine have moving parts that are joined together by one or more pivot joints and that require periodic lubrication with a lubricant like grease or oil. The industrial machine may be mobile, such as the wheel loader, or stationary such as a crane.

The wheel loader 100 can include a machine frame 102 supported on a plurality of wheels 104 that can rotate with respect to the frame to enable the wheel loader to move over the ground or terrain surface 106 of a worksite. To enable rotation, the wheels 104 can be coupled to the machine frame 102 through axle joints 108 or axial bearings that support a rotating axle fixed to the wheel. The wheels 104 may be further configured as powered drive wheels to which rotational torque is applied to drive the wheel loader 100 over the ground 106 and as steerable wheels that can be used to steer the wheel loader as it travels with respect to the ground. In addition to the example of wheels 104, industrial machines of the present type can utilize continuous tracks that translate in a continuous loop with respect to the machine frame to propel the machine over the terrain surface.

To generate power for the drive wheels, the wheel loader 100 can include a prime mover or power plant in the form of an internal combustion engine 110 supported on the machine frame 102. The internal combustion engine 110 can combust a hydrocarbon-based fuel to convert the potential chemical energy therein to rotational power or torque the machine 100 can harness for other work. Examples of suitable fuels to combust include diesel, gasoline, or less traditional fuels such as biofuels, natural gas, etc. In addition to providing power to the drive wheels, the internal combusting engine 110 can provide power to other operational systems and mechanisms associated with the wheel loader 100.

To facilitate steering of the wheel loader 100 with respect to the ground 106, the machine frame 102 may be an articulated machine frame including a forward frame end 112 and a rearward frame end 114 pivotally coupled together at a frame joint 116. The frame joint 116 enables the forward frame end 112 and reward frame end 114 to pivot with respect to an articulation axis 118 that extends vertically through the frame joint 116. Accordingly, the wheels 104 located at the forward frame end 112 can be aligned in a different direction than the wheels located at the rearward frame end 114. The articulated machine frame 102 enables the wheel loader 100 to make shaper turns when maneuvering over the ground 106.

To enable the wheel loader 100 to lift and haul material in accordance with its operative purpose, the wheel loader can include an implement linkage 120 coupled to a work implement or a work tool 122. In the example of a wheel loader 100, the implement linkage 120 may be a lifting implement and the work tool 122 may be a bucket. More particularly, the implement linkage 120 can include one or more elongated lift arms 124 that can be made from rigid, structural steel and can extend between a proximal frame end 126 and a distal tool end 128. To raise and lower the lift arms 124 with respect to the machine frame 102, the proximal frame end 126 can be connected to the forward frame end 112 by a lift joint 130 that enables the lift arms to pivotally articulate with respect to the forward frame end. The lift joint 130 may be configured as a pivot joint and may define a lift axis 132 parallel to the ground and that extends through the location where the proximal frame end 126 is coupled to the forward frame end 112. By pivoting with respect to the lift axis 132, the implement linkage 120 is able to move between a lowered position with the work tool 122 adjacent the ground and a raised position with the work tool vertically evaluated above the ground.

Figure 1:
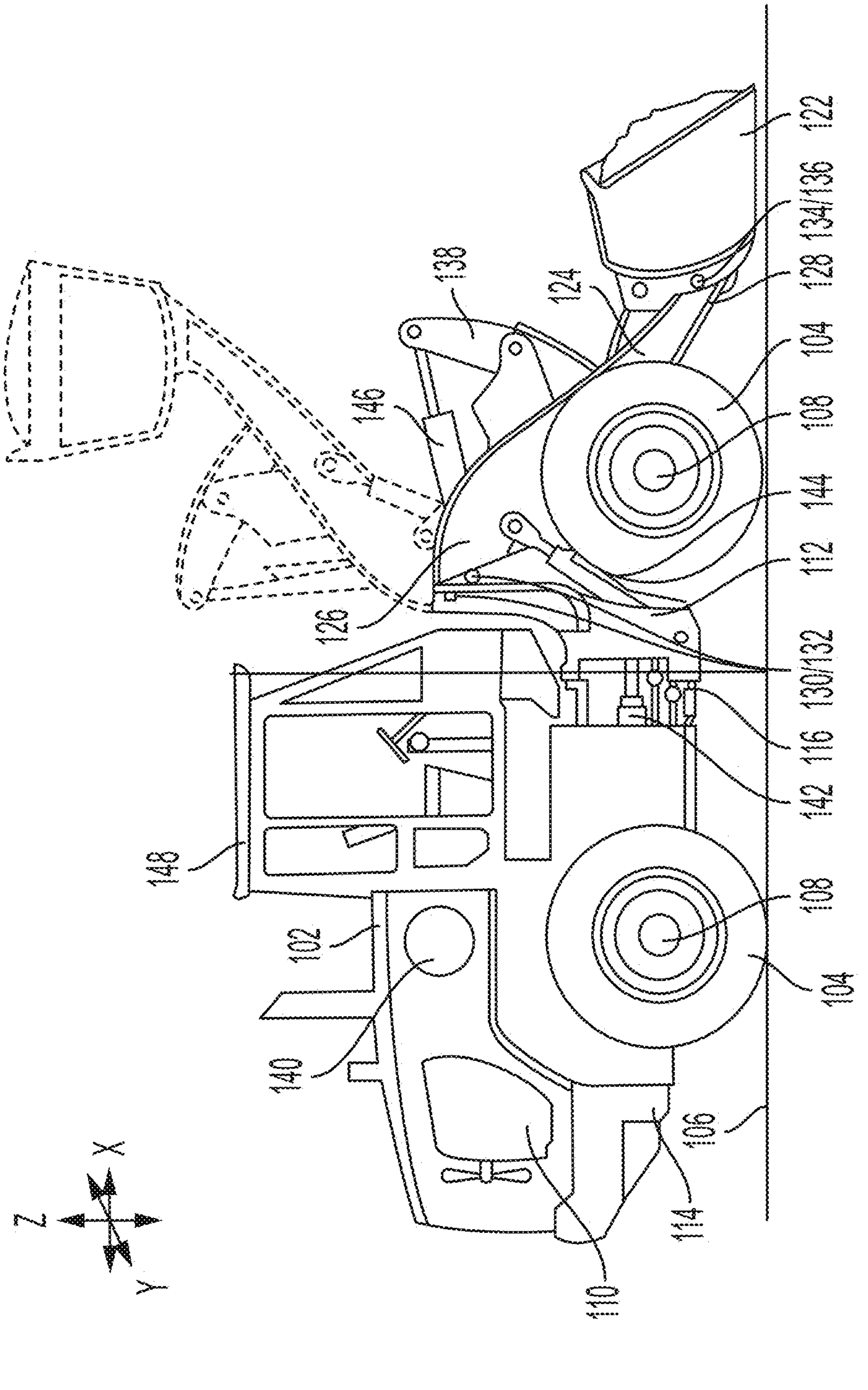
FIG. 1 is a side elevational view of an example of a mobile industrial machine in the embodiment of a wheel loader including an articulated machine frame and an implement linkage coupled to and configured to raise and lower a work implement like a bucket with respect to the terrain surface.

By pivoting as described, the lift joint 130 is therefore able to articulate the implement linkage 120 through a range of angular motions within a spatially defined working envelop with respect to the machine frame 102. The ranges of angular motion may be referred to as different geometric configurations of the implement linkage 120 and may be associated with different tasks or functions being conducted, such as hauling, digging, or dumping. It can be appreciated that rather than allowing for full, 360° rotation, the angular range of articulation of the lift implement provided by the lift joint 130 may be constrained between the lowered position and the raised position as illustrated in FIG. 1.

In the example of a bucket, the work tool 122 can be an opened box-like structure configured to receive and contain material received from and hauled with respect to the ground 106. To haul and dump the material, the bucket may be pivotally connected to the distal tool end 128 of the lift arms 124 by a tilt joint 134. The tilt joint 134 defines a tilt axis 136, also horizontal with respect to the ground 106, which the work tool 122 can pivot with respect to the lift arms 124 associated with the implement linkage 120. In addition, to tilt the bucket, the implement linkage 120 can include one more other rigid structural members like a tilt arm 138 that are also pivotally connected, either directly or indirectly together, to facilitate pivotal articulation of the implement linkage 120 and work tool 122 with respect to each other and the machine frame 102.

To provide motive power to enable articulation of the forward frame end 112 and the rearward frame end 114, as well as to enable movement of the implement linkage 120 and pivoting of the work tool 122 with respect to the articulated machine frame 102, the wheel loader 100 can be operatively associated with a hydraulic system 140. The hydraulic system 140 can be configured to direct pressurized hydraulic fluid to one or more hydraulic actuators that convert the fluid pressure to mechanical motion. To pressurize the hydraulic fluid, the hydraulic system 140 can include a hydraulic pump and the hydraulic actuator may be a plurality of hydraulic cylinders disposed about the machine frame 102. The hydraulic cylinders can include a piston that is moveable within a tubular cylinder body and that is connected to a rod extending from an axial end of the cylinder. When the hydraulic cylinder receives or discharges pressurized hydraulic fluid, the piston is forcibly moved within the cylinder body axially extending or retracting the rod.

For example, to articulate the forward and rearward frame ends 112, 114 and steer the wheel loader 100, one or more steering cylinders 142 can be operatively connected between the frame ends to cause relative pivotal with respect to the frame joint 116. To lift and lower the implement linkage 120 with respect to the terrain surface 106, a lift cylinder 144 can be connected between the forward frame end 112 and the lift arms 124 pivotally connected thereto by the lift joint 130. Likewise, to tilt the work tool 122 at the distal end of the lift arms 124, a tilt cylinder 146 can be connected between the lift arms and the end of the tilt arm 138 in arrangement to pivot the bucket. Hydraulically actuated extension and retraction of the lift cylinder 144 and the tilt cylinder 146 causes the relative pivoting of the lift and tilt joints 130, 134 resulting in movement of the implement linkage 120.

To accommodate an operator, the wheel loader 100 can include an onboard operator cab 148 or operator station disposed on the machine frame 102 at a location providing visibility over the terrain surface 106 and about the worksite. The operator cab 148 can include a plurality of various input/output interfaces like a steering wheel, acceleration pedals, brakes, shift levers, control levers, joysticks, and the like that enable the operator to direct operation of the wheel loader including, by way of example, the implement linkage 120. The wheel loader 100 may also be configured for remote operation and the interfaces associated with the operator cab 148 may be located off-board at a remote location.

The articulated machine frame 102 and the implement linkage 120 coupled to the work tool 122 are examples of kinematic linkages in which rigid links or bodies are able to articulate, rotate, or otherwise move with respect to each other. The frame joint 116, the lift joint 130 and the tilt joint 134 are thus examples of kinematic pivot joints that enable the rigid bodies, such as the forward and rearward frame ends 112, 114, the lift arms 124, and the work tool 122, to pivotally articulate or otherwise move between the different geometric configurations.

The frame joint 116, the lift joint 130, and the tilt joint 134 can be configured as cylindrical pin joints, also referred to a revolt joints, which establishes rotational freedom of movement between the two connected links. Referring to the detailed enlargement in FIG. 2, the kinematic pivot joints 150 may typically include a metal rod or cylindrical pin 152 that is rotatably received as a journal through a pair of aligned circular eyelet blocks 154. The cylindrical pin 152 and the circular eyelet blocks 154 can align with respect to a pin axis 156 of the pivot joint 150 about which rotation of the structure occurs. The cylindrical pin 152 and the circular eyelet blocks 154 are dimensioned to create sliding fit between the correspondingly shaped structures. Moreover, the eyelet blocks 154 provide arcuate bearing surfaces that support and make sliding contact with cylindrical exterior of the pin 152 during rotation around the pin axis 156. To facilitate relative rotation, a lubricant such as grease can be disposed into the sliding interface between the cylindrical pin 152 and the circular eyelet block 154.

Figure 3:
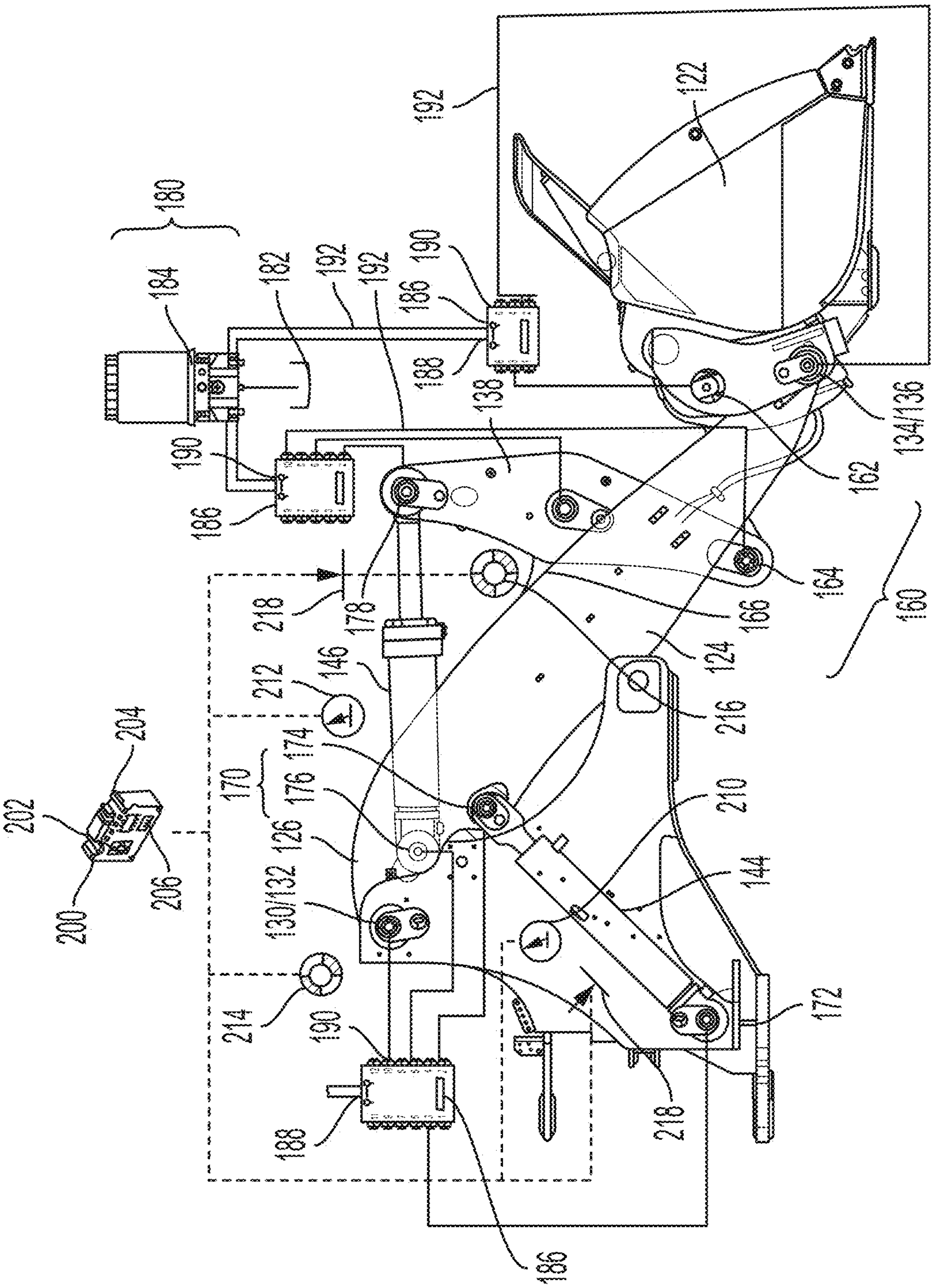
FIG. 3 is a side elevational schematic diagram of the movable implement linkage of the wheel loader for lifting and tilting a bucket that includes a plurality of kinematic pivot joints associated with an automatic lubrication system to lubricate the implement linkage in response to monitored operating conditions.

The frame joint 116, the lift joint 130, and the tilt joint 134 may be examples of linkage joints 160 because they pivotally interconnected the rigid structures or links of the kinematic linkages associated with the wheel loader 100. To increase maneuverability and facilitate load transfer, the kinematic linkages can be associated with additional pivot joints. For example, referring to FIG. 3, the implement linkage 120 can include a tool linkage joint 162 that is associated with the connection between the work tool 122 and lift arms 124 and that cooperatively operates with the tilt joint 134 to pivot the work tool 122 to dump the bucket.

The tilt arm 138 can include a first tilt linkage joint 164 and a second tilt linkage joint 166 that are spaced apart from each other and enable the tilt arm 138 to pivot or tilt forward and rearward with respect to the lift arm 124, to which the tilt arm 138 can be connected by the second tilt linkage joint 166. When the tilt arm 138 pivots about the second tilt linkage joint 166, the first tilt linkage joint 164, which may be indirectly connected to the work tool 122 via the tool linkage joint 162, is moved forward and/or rearward in a manner that pivots the work tool 122 about the tilt joint 134.

In addition, the kinematic linkage 120 can also be associated with additional types of pivot joints to enable articulated motion. For example, with continued reference to FIG. 3, to operatively connect the lift and tilt cylinders 144, 146, the implement linkage 120 can include a plurality of cylinder joints 170 because they pivotally connected with the hydraulic lift and tilt cylinders 144, 146. For example, the lift cylinder 146 can be operatively connected between a first frame cylinder joint 172 located on the forward frame end 112 of the machine frame 102 and a lift arm cylinder joint 174 locate toward an end of the lift arms 124. The ends of the lift cylinder 146 can be configured as bifurcated clevises with eyelets formed at the ends of a bifurcated prong to receive a cylinder pin, thus forming a pivot joint attached to the cooperating structure formed on the forward frame end 112 and lift arms 124 respectively.

To connect the tilt cylinder 146, a second lift arm cylinder joint 176 can be located toward the upper region of the forward frame end 112 and a tilt arm cylinder joint 178 can be formed at an end of the tilt arm 138. Because the cylinder joints 170 are directly connected with the lift and tilt cylinders 144, 146, hydraulic extension and retraction directly applies pulling and/or pushing, or tension and/or compressive, forces and loads to the respective cylinder joints. Moreover, in response to forces applied to the implement linkage 120, the moment may be created with respect to the cylinder joints 170 about the pin axis of the respective joints.

To lubricate the linkage joints 160 and the cylinder joints 170 and facilitate relative motion of the implement linkage 120, the wheel loader 100 is associated with a lubrication system 180. The lubricant used with the lubrication system 180 can be any suitable lubricant such as an oil or grease that has a suitable viscosity and can be made to flow. To accommodate the lubricant, the automatic lubricant system 180 can include a lubricant reservoir 182. To pressurize and direct the lubricant from the lubricant reservoir 182 to the different lubrication points about the wheel loader, the lubricant system 180 can include a lubricant pump 184. The lubricant pump 184 can be any suitable type of pump such as a gear pump with internal intermeshing gears. Relative rotation of the intermeshing gears will displace and direct the grease or other viscous lubricant though the automated lubrication system 180. The lubricant pump 184 may also be driven by a stepper motor than can be controlled so the lubricant pump can deliver a metered amount of lubricant upon receiving an appropriate command. Alternatively, the lubricant pump 184 can be a variable displacement pump.

To distribute the lubricant to the plurality of lubrication points that may correspond to the kinematic joints, the automatic lubrication system 180 can include a plurality of selectively configurable distribution control valves 186. The distribution control valves 186 may be configured as valve blocks having an inlet port 188 and a plurality of outlet ports 190. The outlet ports 190 can be selectively opened and closed by the internal mechanics of the distribution control valves 186. The inlet port 188 can receive pressurized lubricant from the lubricant pump 184 that the distribution control valve 186 selectively distribute to the plurality of outlet ports 190 to direct lubricant onto the intended lubrication points. The internal mechanisms of the distribution control valve may cooperate to adjust or vary the quantity and/or flowrate of lubricant from any individual outlet port 190.

To fluidly connect the distribution control valve 186 with the plurality of linkage joints 160 and cylinder joints 170, the lubrication system 180 can include a plurality of suitable fluid conduits 192 such as hoses or rigid tubes. The fluid conduits 192 can be fixed to and routed about structures such as the forward frame end 112, the lift arm 124 and the tilt arms 138 by hose clamps and the like. The plurality of fluid conduits 192 can terminate at respective lubricant ports 194 that are associated with the linkage joints 160 and cylinder joints 170 to introduce the lubricant thereto.

To regulate and selectively control lubrication of the linkage joints 160 and cylinder joints 170, the lubrication system 180 can be automated through operative association with an electronic controller 200, also referred to as an electronic control unit (ECU) or electronic control module (ECM). The electronic controller 200 can be a programmable computing device and can include one or more microprocessors 202, non-transitory computer readable and/or writeable memory 204 or a similar storage medium, input/output interfaces 206, and other appropriate circuitry for processing computer executable instructions, programs, applications, and data.

The microprocessor 202 of the electronic controller 200 may be configured to process digital data in the form of binary bits and bytes and can have any suitable configuration such as an application specific integrated circuit (ASIC), a field programmable gate array (FPGA), or a similar configuration. In addition to regulating the lubrication system 180, the electronic controller 200 may be responsible for monitoring and regulating operation of the other systems and devices associated with the wheel loader 100. Although illustrated as a unitary device, the electronic controller 200 and its functionality may be distributed among a plurality of computing devices.

The electronic controller 200 can be in electronic communication with the plurality of distribution control valves 186 via electronic data buses or a similar electronic communication network such as conductive wires or the like. The electronic controller 200 can communicate appropriate analog or digital data signals to selectively configure the flow distribution valves 186 to open or close the desired inlet and outlet ports 188, 190 to selectively distribute the lubricant to the lubrication ports associated with the linkage and cylinder joints 160, 170 in a desired manner.

To determine which linkage and cylinder joints 160, 170 require lubrication, the electronic controller 200 is configured to actively monitor operation and mechanized movements of the implement linkage 120 via a plurality of onboard implement sensors. For example, to determine the forces and load being applied to the implement linkage 120, various hydraulic pressure sensors can be operatively associated with the hydraulic actuators, including a lift pressure sensor 210 associated with the lift cylinder 146 and a tilt pressure sensor 212 associated with the tilt cylinder 146. The lift pressure sensor 210 and tilt pressure sensor 212 are capable of measuring fluid pressure in the lift and tilt cylinders 144, 146 respectively in terms of hydraulic force per area.

The lift and tilt pressure sensors 210, 212 can utilize any appropriate pressure measurement technique, for example, converting the hydrostatic fluid forces present in the body of the lift and tilt cylinders 144, 146 to the linear forces or loads applied through extension and retraction of the rod directly to the cylinder joints 170. The lift and tilt pressure sensors 212, 212 convert the pressure and/or force measurements to electronic data signal that is electronically communicated to the input/output interface 206 of the electronic controller 200 for further processing.

To measure the movements of implement linkage 120 and determining the different the geometric configures assumed by the implement linkages, one or more position sensors can be included at different locations about the implement linkage. For example, to determine the angular position and movements of the linkage and cylinder joints 160, 170, a plurality of angular position sensors can be associated with the various joints of the implement linkage 120, including a lift position sensor 214 associated with the lift joint 130 and a tilt position sensor 216 associated with the tilt arm 138 to measure pivotal articulation of the tilt joint 134. The angular positions sensors can be rotary encoders that convert the angular positions of, for example, the cylindrical pins 154 in terms of angular degrees or radians. By way of example, the lift position sensors 214 can be configured to measure the relative angular positions of the lift arms 124 with respect to the forward frame end 112 of the wheel loader 100 and the tilt position sensor 216 can be configured to measure the relative angular position of the tilt arm 138, and thereby indirectly measure the angular position of the tilt joint 134.

Another type of positions sensor can be a linear sensor 218 that may be associated with the lift and tilt cylinders 144, 146. The linear sensors 218 can be configured to measure the linear travel or displacement of the rod extending and retracting with respect to the cylinder body of the lift and tilt cylinder 144, 146. The linear sensors 218 can operate using electromagnetic, optical, or conductive sensing techniques. Because the lift and tilt cylinder 144, 146 are fixedly constrained to the respective cylinder joints 170, the extension and retraction of the cylinders can be converted to pivotal or angular motion of, for example, the lift arms 124 and/or tilt arm 138 coupled to the work tool 122.

Figure 4:
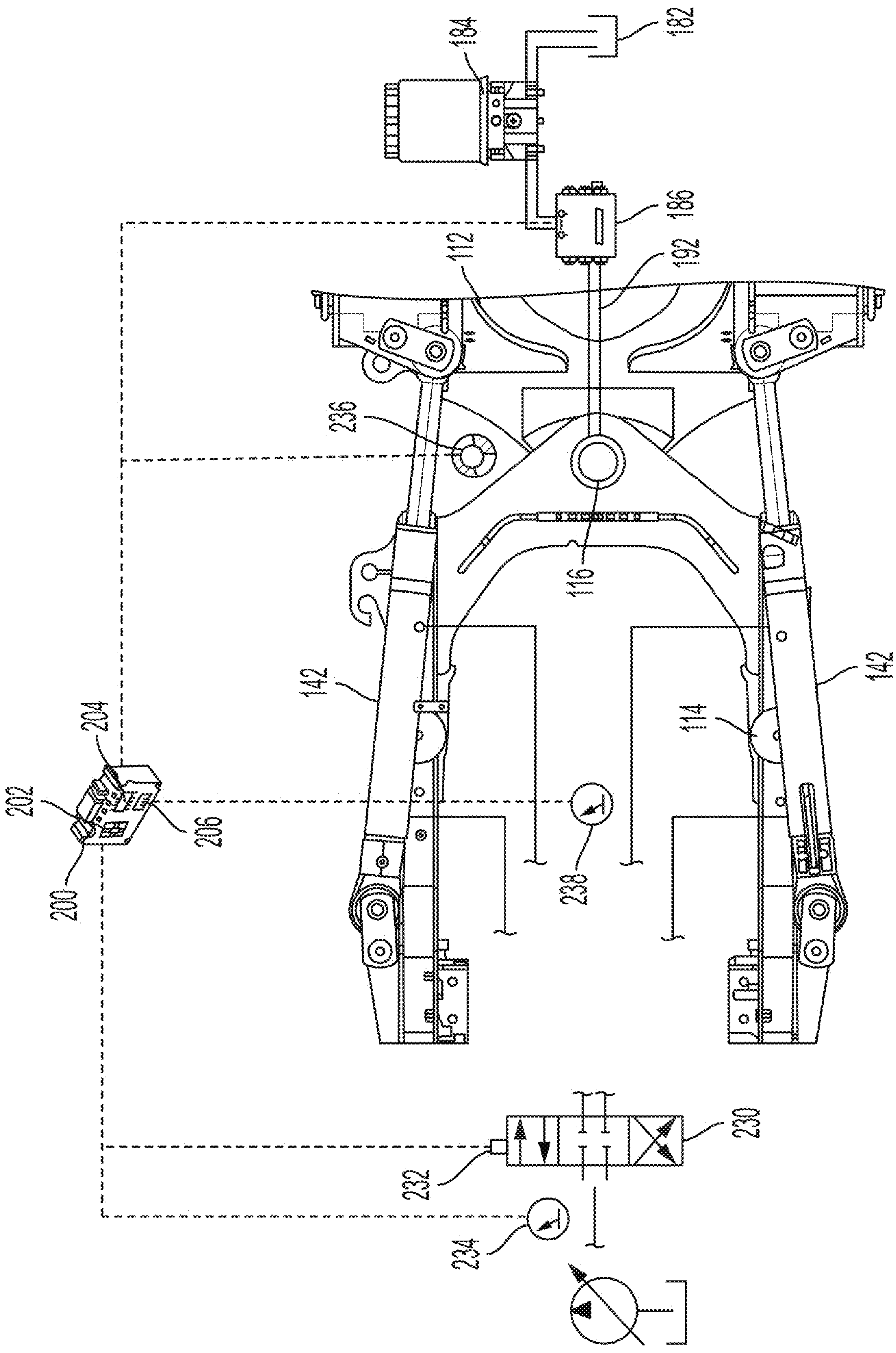
FIG. 4 is a top plan schematic diagram of the articulated machine frame of the wheel loader associated with an automatic lubrication system to lubricate the frame joint in response to monitored operation conditions.

In addition to lubricating the linkage and tilt joints 130, 134 associated with the implement linkage 120, the electronic controller 200 can also be arranged to direct the lubrication system 180 to responsively lubricant the frame joint 116 linking the forward frame end 112 and the rearward frame end 114 comprising the articulated machine frame 102. Referring to FIG. 4, to pivot the articulated machine frame 102, the steering cylinders 142 are provided as pair including a first steering cylinder 142*a* and a second steering cylinder 142*b* connected between forward frame end 112 and the rearward frame end 114 extending laterally to the sides of the frame joint 116. The pair of steering cylinders 142*a*, 142*b* can extend and retract in an inverse relation to cooperatively pivot the forward frame end 112 and the rearward frame end 114 with respect to each other. Extension of the pair of steering cylinders 142*a*, 142*b* therefore indirectly apply force and loads to frame joint 116 through the forward and rearward frame ends 112, 114.

Accordingly, to lubricate the frame joint 116, the lubricant system 180 can be fluidly connected through a distribution control valve 186 to the frame joint 116. Upon receiving appropriate command signals from the electronic controller 200, the distribution control valve 186 may deliver lubricant to the frame joint 116.

In an embodiment, to selectively actuate the steering cylinders 142*a*, 142*b*, a steering control valve 230 can be located in fluid communication with the hydraulic system 140. The steering control valve 230 can be a solenoid actuated spool valve that directs pressurized hydraulic fluid alternatively between the steering cylinders 142 and the hydraulic system 140. Further, the steering control valve 230 can be a proportional valve configured to variably adjust the flowrate of hydraulic fluid to and from the steering cylinders 142, thereby adjusting the volume and/or pressure applied to the of extension and retraction of the steering cylinders 142. Accordingly, one of the steering cylinders 142*a*, 142*b* may extend and the other retract by selective configuration of the steering control valve 230 thereby pivoting the forward and rearward frame ends 112, 114 and steering the wheel loader 100.

To determine the stresses and loads applied indirectly to the frame joint 116 by the steering cylinders 142*a*, 142*b*, the steering control valve 230 can include a valve sensor 232 and a steering pressure sensor 234. The valve sensor 232 that can measure the operational setting of the steering control valve and thus the flowrate of hydraulic fluid to and from the steering cylinders 142*a*, 142*b*. For example, the valve sensor 232 can measure the electronic control signals used to actuate and set the steering control valve 230 and are thus indicative of the flowrate and direction of hydraulic fluid to and from the steering cylinders 142*a*, 142*b*. The valve sensor 230 can be a spool position sensor, a flowrate sensor, etc.

Further, the steering pressure sensor 234 can be disposed in fluid communication with hydraulic pump associated with the hydraulic system 140 and the steering cylinders 142*a*, 142*b* to measure the hydraulic fluid pressure. The hydraulic pump and the hydraulic system 140 can be dedicated to actuating the steering cylinders 142*a*, 142*b* or can associated with of other hydraulic components on the wheel loader. The steering pressure sensor 234 may measure the hydraulic pressure delivered directly from the hydraulic pump of the hydraulic system 140, and thus indirectly the hydraulic pressure delivered to the pair of steering cylinders 142*a*, 142*b*.

The electronic controller 200 can process the electronic data communicated from the valve sensor 232 and the steering pressure sensor 234 to determine the degree of angular articulation of the forward and rearward frame ends 112, 114 and the forces applied by the steering cylinder 142*a*, 142*b* to the frame joint 116. For example, the electronic controller 200 can determine the hydraulic pressure in the steering cylinder 142*a*, 142*b* based on the hydraulic pressure associated with the hydraulic pump of the hydraulic system 140 obtained from the steering pressure sensor 234. The hydraulic pressure may be adjusted by the steering control valve 230, for example, the pressure may be throttled, and the electronic controller 200 can determine the degree or amount of adjustment from the operational settings of the steering control valve 230 obtained from the valve sensor 232. In another example, a frame joint sensor 236 such as a rotary encoder can be associated with the frame joint 116 to measure the relative angular positions of the forward and rearward frame ends 112, 114.

In another example, the electronic controller 200 can be in electronic communication with one or more steering cylinder sensors 238 that are operatively associated directly with the first and second steering cylinders 142*a*, 142*b*. The steering cylinder sensors 238 can be directly attached to the steering cylinders 142*a*, 142*b* or disposed in the fluid lines to and from the steering cylinder 142*a*, 142*b*. The steering cylinder sensors 238 may be pressure sensors measuring the fluid pressure in the steering cylinders 142*a*, 142*b* or may be positions sensors measuring the linear extension or retraction of the steering cylinders 142*a*, 142*b*.

INDUSTRIAL APPLICABILITY

Figure 5:
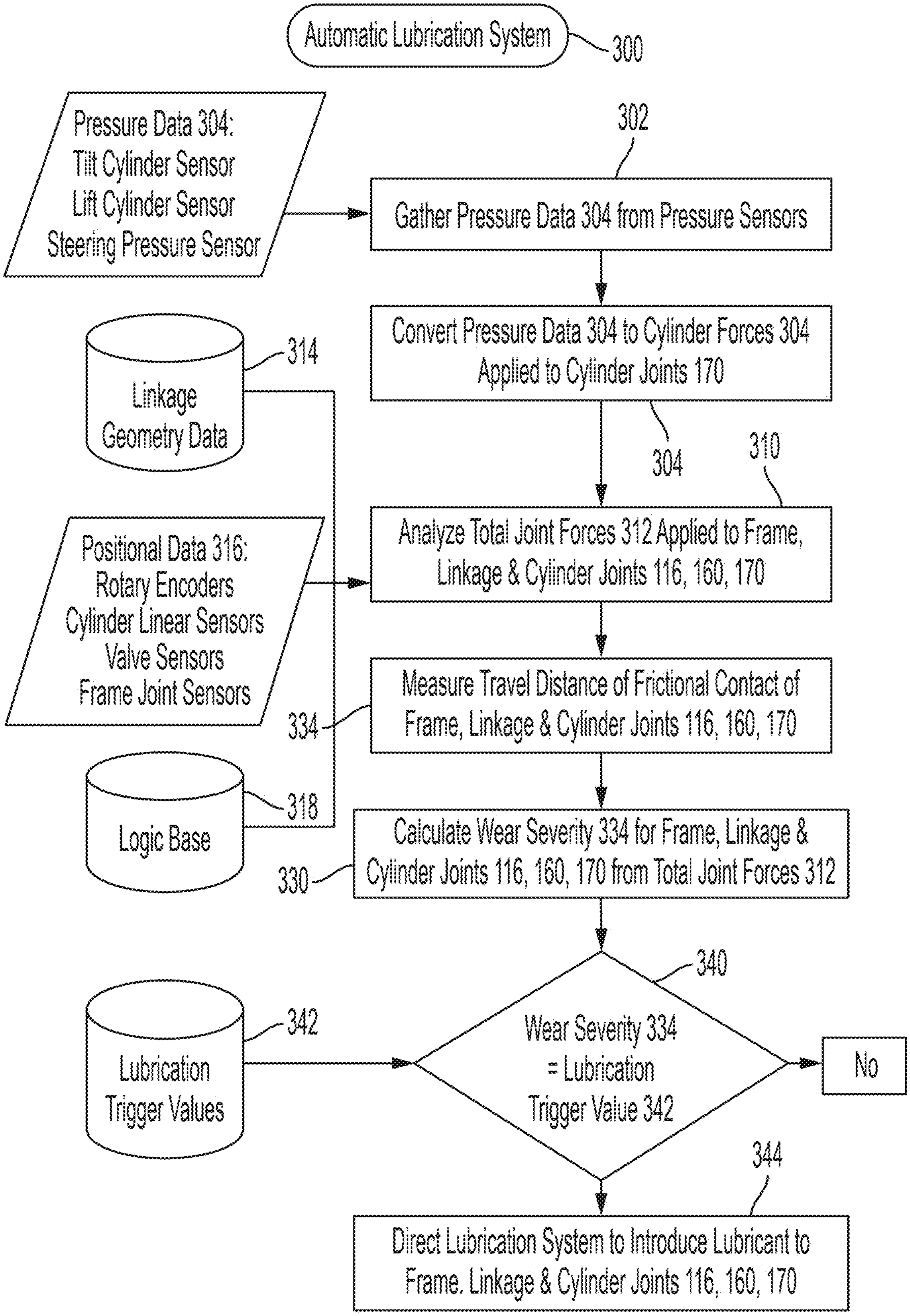
FIG. 5 is a flow diagram of a possible process or method for measuring and converting the hydraulic pressures actuating the kinematic linkages and converting the measured pressures to determine the wear severity applied to the kinematic pivot joints.

Referring to FIG. 5 and with continued reference to the preceding figures, the electronic controller 200 can be programmed to conduct an automatic lubrication system 300 or process method to automatically lubricate the plurality of linkage and/or cylinder joints associated with the kinematic linkages on the wheel loader 100 or a similar industrial machine. The automatic lubrication process 300 can be embodied as non-transient computer readable software written in a applicable programming language and can be reside as a software program or application stored in the data memory 204 associated with the electronic controller 200. The processor 202 of the electronic controller 200 can execute the instructions of the automatic lubrication process 300 to retrieve and analyze data from the onboard machine sensors and generate responsive commands to the hydraulic system 140 and/or the lubrication system 180.

For example, in an initial data gathering step 302, the automatic lubrication system 300 can obtain pressure data 304 from the plurality of pressure sensors including the lift pressure sensor 210, the tilt pressure sensors 212, and the steering pressure sensor 234. The data gathering step 302 can obtain pressure data 304 through read requests sent to the appropriate onboard sensors, or the pressure data 304 can be continuously transmitted to the electronic controller.

In a data conversion step 306, the automatic lubrication system 300 can convert the pressure readings included pressure data 304 to one or more cylinder force values 308. The cylinder force values 308 can be indicative of the forces or loads applied by actuation of the hydraulic cylinders on the structure of the machine frame 102 and/or the implement linkage 120. For example, the hydraulic pressure of the lift cylinder 144 can directly relate to the compressive or tension forces and loads applied by the lift cylinder 144 to the first frame cylinder joint 172 and the lift arm cylinder joint 174. Likewise, the pressure data 304 received from the tilt cylinder 146 can be indicative of the forces applied by cylinder actuator between to the second lift arm cylinder joint 176 and the tilt arm cylinder joint 178. The data conversion step 306 can convert the pressure data 304 to the cylinder force values 308 by applying predetermined information about the structural and operational configuration of the various hydraulic actuators.

In another example, the automatic lubrication system 300 may determine the cylinder force values 308 by indirectly measuring the pressure the hydraulic cylinders. For example, the data conversion step 306 can obtain the hydraulic pressure from the hydraulic pump associate with the hydraulic system 140 and delivered to the steering control valve 230. The data conversion step 306 may also obtain data about the operational settings of the steering control valve 230 from the valve sensor 232 and process that data with information about the throttle effects of the steering control valve 230 to determine the hydraulic pressure in the steering cylinders 142*a*, 142*b*. In an example, pressure date 304 associated with the lift and tilt cylinder 144, 146 can be also indirectly measured from the hydraulic pressure of the hydraulic system 140 as adjusted by one or more control valves.

To determine the forces and loads applied to the linkage and pin joints 160, 170, the automatic lubrication system 300 may conduct a mechanical or structural analysis applying statics and kinematics. For example, in addition to the cylinder force values 308 applied by the lift and tilt cylinders 144, 146, the total forces applied on any of the cylinder joints 170 can be affected by other factors including the geometric arrangement and configuration of the implement linkage 120 and the loads associated with the work tool 122. Likewise, because the linkage joints 160 are not directed connected with the lift and tilt cylinders 144, 146, the total forces applied to the linkage joints 160 have to calculated indirectly by applying statics and kinematic analysis to the cylindrical forces valves 3008 obtained from the data conversion step 306.

The automatic lubrication system 300 therefore may include an analysis step 310 in which the total joint force 312 applied to each of the linkage joints 160 and the cylinder joints 170 is determined through calculations. The total joint force 312 can be indicative of the total force applied to a specific joint resulting from the structural loads associated with the articulated machine frame 102 and the implement linkage 120 and the operational loads created by engagement of the work tool 122.

To conduct the analytic calculations, the analysis step 310 can retrieve linkage geometry data 314 about the geometry and dimensions of the articulated machine frame 102 and the implement linkage 120. The linkage geometry data 314 may include information such as the size and shape of the lift and tilt arms 124, 138, the distance between the various linkage and cylinder joints 160, 170, and other information. The linkage geometry data 314 can be obtained by design of the wheel loader 100 and can be stored as a data set or data library residing in the memory 204 of the electronic controller 200 and accessible by the automatic lubrication system 300.

The analysis step 310 can also obtain positional data 316 from the various onboard machine sensors that are indicative of the geometric configurations and positions of the wheel loader 100 particularly the articulated machine frame 102 and/or the implement linkage 120. For example, the positional data 316 can be obtained as electronic data from the lift angle sensor 214 and the tilt angle sensor 216, which the electronic controller 200 can process to determine the geometric configuration of the implement linkage 120 with respect to the x-y-z coordinate system. The positional data 316 can also include the measurements from the linear sensors 218 related to the extension and retraction of the lift and tilt cylinder 144, 146 that can also be indicative of the geometric configuration of the implement linkage 120.

The positional data 316 can also include data obtained from the valve sensor 232 such as hydraulic flow rate to and from the steering cylinders 142*a*, 142*b*, which the electronic controller 200 can process to determine the articulation or steering angle of the forward and rearward frame ends 112, 114. Likewise, the positional data 316 can include measurements made directly of the frame joint 116 by the frame joint sensor 236 that reflect the angular positions of the forward and rearward frame ends 112, 114 and thus the steering angle and direction of the wheel loader 100 in the x-y-z coordinate system.

To process the cylinders force values 308 with the linkage geometry data 314 and the positional data 316, the analysis step 310 can access various logic rules and analytic formulas and equations that may be stored in a logic directory or logic base 318. The logic base 318 can include the equations for mathematically processing the various values and data inputs. The calculated or determined results of the analysis step 310 can be the total joint forces 312 and loads applied to each of the linkage and cylinder joints 160, 170 for the current geometric configuration of the wheel loader 100.

To determine the wear caused to the linkage and cylinder joints 160, 170 resulting from the total joint forces 312, the automatic lubrication system 300 can include a wear calculation operation 330 or step. Wear may refer to the damage and removal of material from the structural components associated with the linkage and cylinder joints 160, 170 due to the forcible contact and relative frictional motions of the parts. In this context, wear may also refer to adhesive or abrasive wear or galling. Referring to FIG. 2, wear can result in damage and removal of the metallic material of the cylinder pin 152 and/or the circular eyelet block 154. Excessive wear can result in failure of the linkage and cylinder joints 160, 170.

To conduct the wear calculation step 330, a wear model or equation can be applied. For example, the wear equation or wear model can be:

$$V=K^*(W^*L/H_v)$$

Wherein V is the adhesive wear, K is the wear coefficient, W is load or force, L is the sliding distance, and $H_v$ is the hardness of the material. The wear coefficient K and the material hardness $H_v$ can be constants that can be looked up and retrieve by the electronic controller 200 for a wear data table 332 or library that is associated with the automatic lubrication system 300. The load or force W may be equal to the total joint forces 312 calculated by the analysis operation 310.

It can be appreciated that in addition to the total joint forces 312, wear is typically affected by the travel distance in which two parts are place in frictional contact. To determine the sliding distance L, the wear calculation step 330 can be associated with a sliding measurement step 334. The sliding measurement step 334 can obtain and utilize the measurement data from the positional sensors such as the lift angle sensor 214, tilt angle sensor 216, and the frame joint sensor 236. The angular measurements can be converted to linear distance measurements for use in the wear model based on the joint geometry that may be included as part of the linkage geometry data 314.

The result of the wear calculation operation 330 may reflect the current or instant wear severity 334 occurring with respect to the frame joint 116 and/or the linkage and cylinder joints 144, 146. The wear severity 334 reflects the damage or galling that may occur to the pivot joints 150 associated with frame joint 116 and/or the linkage and cylinder joints 130, 134 based on the present loading conditions and motions of the articulated machine frame 102 and the implement linkage 120.

To avoid or remedy excessive wear and damage to the kinematic joints, the automatic lubrication system 300 can include a lubrication decision step 340 that quires if the wear severity 334 indicates that the lubrication system 180 should be employed to lubricate the kinematic joints. For example, the lubrication decision step 340 can retrieve and compare the wear severity 334 with a lubrication trigger value 342 or threshold. The lubrication trigger value 342 may represent a tolerable value of wear that may be subjected to one of the kinematic joints and may be predetermined empirically or theoretically. Lubrication trigger values 342 can be determined for each of the frame joint 116 and the linkage and cylinder joints 130, 134 based on the materials, design, and tolerances associated with those particular kinematic joints.

The lubrication trigger value 342 can be stored in a lookup table or library associated with the automatic lubrication system 300.

The lubrication decision step 340 compares the wear severity 334 and the lubrication trigger value 342 to determine if lubricating the frame joint 116 and/or the linkage and cylinder joints 130, 134 is appropriate for the particular operating conditions and may reduce wear. If the lubrication decision step 340 determines the wear severity 334 exceeds the lubrication trigger valve 342, the automatic lubrication system 300 can generate a lubrication command 344 electronically communicated to the distribution control valve 186. The distribution control valve 186 responsively direct a quantity of lubrication such as grease to the relevant kinematic joint. In an example, the quantity of lubrication, which may be a result of the pressure of the lubricant pump 184 or duration of opening state of the distribution control valve 186, can be related to the difference or discrepancy between the wear severity 334 and the lubrication trigger value 342 as determined by the lubrication decision step 340.

Figure 6:
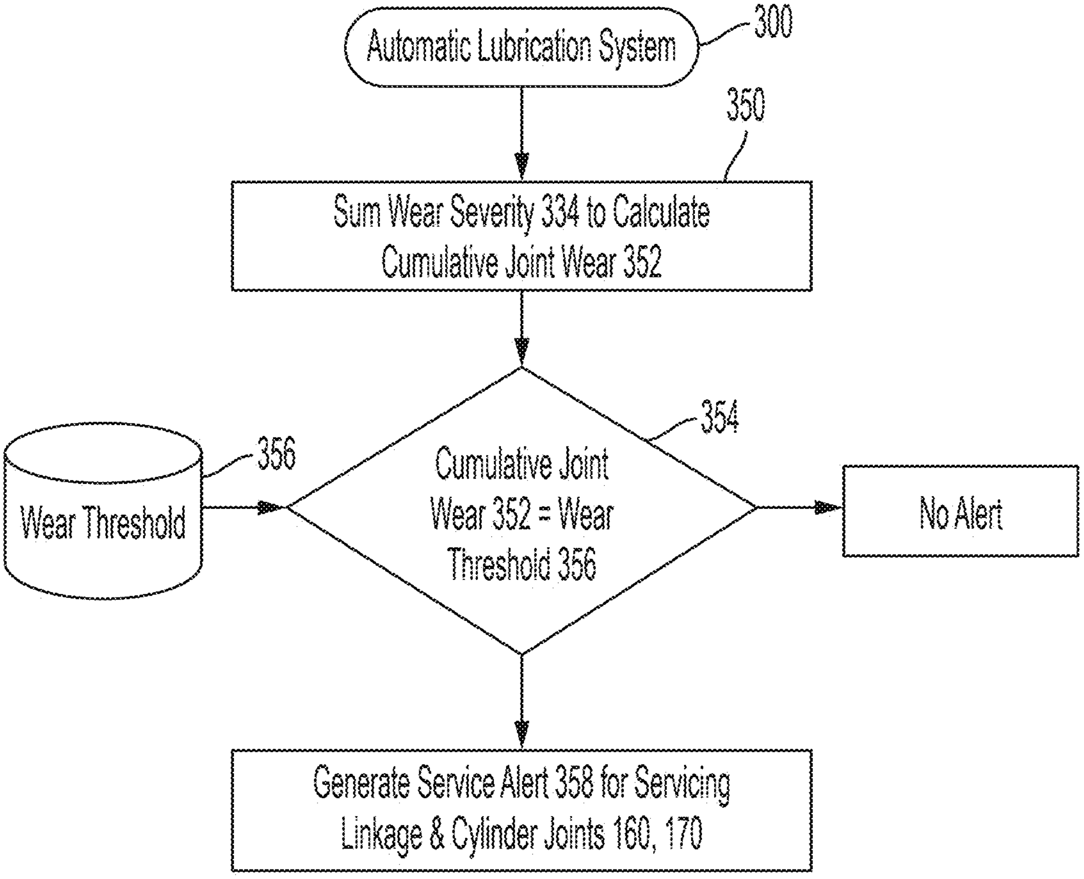
FIG. 6 is a flow diagram of a possible process or method for monitoring the loads and stresses applied to the kinematic linkages for operating an automatic lubrication system and/or assessing service or wear of the kinematic pivot joints.

In a further example, referring to FIG. 6, to determine the cumulative effect of wear on the kinematic joints of the wheel loader 100, the automatic lubrication system 300 can include a summation step or operation 350 that determines the cumulative joint wear 352 for each of the plurality of kinematic joints. The summation step 350 may continuously receive the calculated output from the wear calculation operation 330 such that the cumulative joint wear 352 reflects the total historic wear and damage caused to the respective frame joint 116 and/or the linkage and cylinder joints 160, 170. The cumulate joint wear 352 can reflect the wear and damage applied to the cylinder pin 152 of the pivot joint 150 over time, although the cumulative joint wear may also reflect damage to other portions of the joint structure.

The automatic lubrication system 300 can include a service decision step 354 or operation that checks the cumulative joint wear 352 with a wear threshold 356 to determine if service of the pivot joint 150, for example replacement or re-machining of the cylindrical pin 152 and/or eyelet blocks 154, is appropriate. The wear threshold 356 can be determined empirically from historic testing data, and can be stored as a plurality of data values for each of the frame joint 116 and/or the linkage and cylinder joints 160, 170 in lookup table or library residing in the memory 204 of the electronic controller 200.

In the event the service decision step 354 determine the cumulative joint wear 352 exceeds the wear threshold 356, the electronic controller 200 can generate and communicate a service alert 358 to an operator of the wheel loader 100. The service alert 358 may be communicated to the onboard operation station 148 and may indicate that inspection and possible service of the kinematic joints is appropriate. In another example, the cumulative joint wear 352 may be communicated as electronic data signal via a radio frequency communication to an offboard fleet maintenance system or the like via a telemetry communications arrangement.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure and the protection to which applicant is entitled more generally. All language of distinction and disparagement with respect to certain features is intended to indicate a lack of preference for those features, but not to exclude such from the scope of the disclosure entirely unless otherwise indicated.

We claim:

1. A mobile machine comprising:

an articulated machine frame having a forward frame end and a rearward frame end pivotally connected by a frame joint;

a steering cylinder, connected to the forward frame end and the rearward frame end, configured to pivot the articulated machine frame;

an implement linkage pivotally connected to the forward frame end at a lift joint;

a lift cylinder, connected to the forward frame end and the implement linkage, configured to pivot the implement linkage;

a work tool pivotally connected to the implement linkage at a tilt joint;

a tilt cylinder configured to pivot the work tool; and an electronic controller configured to:

determine pressure data associated with a respective cylinder of one or more of the steering cylinder, the lift cylinder, or the tilt cylinder;

determine, based on the pressure data, a total joint force applied to a respective joint of one or more of the frame joint, the lift joint, or the tilt joint;

determine, based on monitored operation of the mobile machine, a travel distance of a frictional contact associated with the respective joint;

determine, based on the total joint force and the travel distance of the frictional contact, a wear severity of the respective joint under present operating conditions;

determine a difference between the wear severity and a lubrication trigger value associated with the respective joint; and direct a quantity of lubrication to the respective joint relating to the difference.

2. The mobile machine of claim 1, wherein the wear severity is further based on at least one of:

a hardness of a material associated with the respective joint, or a wear coefficient associated with the respective joint.

3. The mobile machine of claim 2, wherein the electronic controller is further configured to:

identify the at least one of the hardness of the material or the wear coefficient from a wear data table.

4. The mobile machine of claim 1, wherein, to determine the travel distance of the frictional contact for the respective joint, the electronic controller is configured to:

obtain angular position data from one or more position sensors associated with the respective joint; and convert the angular position data to a linear sliding distance based on linkage geometry of the respective joint.

5. The mobile machine of claim 1, wherein the lubrication is directed to the respective joint when the wear severity exceeds the lubrication trigger value.

6. The mobile machine of claim 1, wherein, to determine the total joint force, the electronic controller is configured to:

convert the pressure data to a cylinder force applied to a cylinder joint; and determine the total joint force based on the cylinder force and a geometric configuration of the implement linkage.

7. The mobile machine of claim 6, wherein the electronic controller is further configured to:

obtain positional data associated with one or more of the articulated machine frame or the implement linkage, wherein the geometric configuration of the implement linkage is determined based on the positional data.

8. The mobile machine of claim 7, wherein the electronic controller is further configured to:

obtain linkage geometry data associated with the one or more of the articulated machine frame or the implement linkage, wherein the geometric configuration of the implement linkage is further determined based on the linkage geometry data.

9. The mobile machine of claim 1, wherein the wear severity corresponds to a first wear severity value at a first point in time, wherein the electronic controller is further configured to:

determine a cumulative joint wear for the respective joint by summing the first wear severity value with a second wear severity value associated with the respective joint at a second point in time;

compare the cumulative joint wear with a wear threshold associated with the respective joint; and generate a service alert for the respective joint based on comparing the cumulative joint wear with the wear threshold.

10. The mobile machine of claim 1, wherein, to determine the pressure data associated with the respective cylinder, the electronic controller is configured to:

obtain hydraulic pressure from a hydraulic system;

obtain valve operational settings from a hydraulic control valve; and determine the pressure data associated with the respective cylinder based on the hydraulic pressure and the valve operational settings.

11. A method, comprising:

determining pressure data associated with one or more hydraulic cylinders arranged to actuate a kinematic linkage associated with an industrial machine;

determining, based on the pressure data, a total joint force applied to a pivot joint of the kinematic linkage;

determining, based on monitored operation of the industrial machine, a travel distance of a frictional contact associated with the pivot joint;

determining, based on the total joint force and the travel distance of the frictional contact, a wear severity of the pivot joint;

determining a difference between the wear severity and a lubrication trigger value associated with the pivot joint; and directing a quantity of lubrication to the pivot joint relating to the difference.

12. The method of claim 11, wherein the wear severity is further based on at least one of:

a hardness of a material associated with the pivot joint, or a wear coefficient associated with the pivot joint.

13. The method of claim 12, further comprising:

identifying the at least one of the hardness of the material or the wear coefficient from a wear data table.

14. The method of claim 11, further comprising:

converting the pressure data to a cylinder force applied to the pivot joint, wherein the total joint force is further determined based on the cylinder force and a geometric configuration of the kinematic linkage.

15. The method of claim 14, further comprising:

obtaining positional data associated with one or more of: an articulated machine frame of the industrial machine, or the kinematic linkage, wherein the geometric configuration of the kinematic linkage is determined based on the positional data.

16. The method of claim 15, further comprising:

obtaining linkage geometry data associated with the one or more of the articulated machine frame or the kinematic linkage, wherein the geometric configuration of the kinematic linkage is further determined based on the linkage geometry data.

17. The method of claim 11, wherein the pressure data is associated with a first steering cylinder and a second steering cylinder fluidly connected to a hydraulic system by a steering control valve.

18. The method of claim 17, further comprising:

obtaining valve operational data from the steering control valve, wherein the pressure data is determined based on hydraulic pressure, associated with the steering control valve, and the valve operational data.

19. The method of claim 11, wherein the wear severity corresponds to a first wear severity value at a first point in time, the method further comprising:

calculating a cumulative joint wear for the pivot joint by summing the first wear severity value with a second wear severity value associated with the pivot joint at a second point in time;

comparing the cumulative joint wear with a wear threshold for the pivot joint; and generating a service alert for the pivot joint based on comparing the cumulative joint wear with the wear threshold.

20. A mobile machine, comprising:

an articulated machine frame comprising a forward frame end and a rearward frame end pivotally connected at a frame joint;

a steering cylinder, connected between the forward frame end and the rearward frame end, configured to pivot the articulated machine frame;

a steering control valve configured to selectively direct hydraulic fluid to the steering cylinder; and an electronic controller, configured to:

determine pressure data, associated with the steering cylinder, based on hydraulic pressure, from a hydraulic system, and operational settings of the steering control valve;

determine, based on the pressure data and a steering configuration of the articulated machine frame, a total joint force applied to the frame joint;

determine, based on the total joint force, a wear severity that reflects a current wear condition of the frame joint under present operating conditions;

compare the wear severity with a lubrication trigger value of the frame joint; and in response to the wear severity exceeding the lubrication trigger value, select, based on a geometric configuration of the frame joint, a lube port, from a plurality of lube ports associated with the frame joint, not obstructed by a component of the frame joint for receiving lubrication; and deliver lubricant to the selected lube port.

* * * * *